(12) United States Patent
Krause

(10) Patent No.: US 7,143,348 B1
(45) Date of Patent: Nov. 28, 2006

(54) METHOD AND APPARATUS FOR ENHANCING ELECTRONIC READING BY IDENTIFYING RELATIONSHIPS BETWEEN SECTIONS OF ELECTRONIC TEXT

(76) Inventor: Philip R Krause, 9437 Seven Locks Rd., Bethesda, MD (US) 20817

( * ) Notice: Subject to any disclaimer, the term of this patent is extended or adjusted under 35 U.S.C. 154(b) by 449 days.

(21) Appl. No.: 09/524,590

(22) Filed: Mar. 14, 2000

Related U.S. Application Data

(63) Continuation-in-part of application No. 09/015,660, filed on Jan. 29, 1998.

(60) Provisional application No. 60/036,305, filed on Jan. 29, 1997.

(51) Int. Cl.
  *G06F 15/00* (2006.01)
  *G06F 7/00* (2006.01)
(52) U.S. Cl. ............... 715/526; 707/1; 707/2; 707/3; 707/4; 707/5; 707/6; 707/102
(58) Field of Classification Search ........... 715/513, 715/512, 501.1, 532, 526; 707/1–6, 7, 102
See application file for complete search history.

(56) References Cited

U.S. PATENT DOCUMENTS

| | | | | |
|---|---|---|---|---|
| 5,146,552 A | * | 9/1992 | Cassorla et al. | 715/512 |
| 5,530,852 A | * | 6/1996 | Meske et al. | 709/206 |
| 5,634,064 A | * | 5/1997 | Warnock et al. | 715/513 |
| 5,708,825 A | * | 1/1998 | Sotomayor | 715/501.1 |
| 5,819,273 A | * | 10/1998 | Vora et al. | 707/10 |
| 5,857,185 A | * | 1/1999 | Yamaura | 707/5 |
| 6,040,920 A | * | 3/2000 | Ichiriki | 358/403 |
| 6,041,323 A | * | 3/2000 | Kubota | 707/5 |
| 6,212,494 B1 | * | 4/2001 | Boguraev | 704/9 |
| 6,546,406 B1 | * | 4/2003 | DeRose et al. | 715/513 |

OTHER PUBLICATIONS

MPEP electronic publication book was created with INSIGHT Publishing Productivity, Ver 5.1, Copyright © 1998 Enigma.*
Hendren et al., Designing Programming Languages for Analyzability: A Fresh Look at Pointer Data Structures, 1992, IEEE, Computer Languages, 1992., Proceedings of the 1992 International Conference on Apr. 20-23, 1992, pp. 242-251.*

* cited by examiner

*Primary Examiner*—William Bashore
*Assistant Examiner*—Chau Nguyen

(57) ABSTRACT

An apparatus, method and article of manufacture of the present invention detects the presence of references to the same concept in separate sections of text, and, with no input required from the reader, presents the reader with information concerning the detected references to the concept. The information provided may comprise information related to the location of the reference to the concept in other sections of text, and the reader also is provided the ability to move from one reference to a concept directly to another reference to the same concept.

34 Claims, 6 Drawing Sheets

FIGURE 1. Computer system

Figure 3.

File   Edit   Display   Advance   Search   Audio   Windows

Krause: Law for the idiot — p. 47

Among the most important protections granted by the fourteenth amendment is that of procedural due process. This guarantees a citizen that due process will be adhered to in all criminal proceedings.

It is not always simple to determine which processes are due. It is particularly important that the procedural process is due, rather than overdue. Likewise, the procedural nature of the due process ensures that appropriate procedures are followed when processes are due. If dues have not yet been paid, the procedural due process is said to be "in arrears," which indicates that procedures to restore due process are long overdue.

What processes require due procedures? All processes for which procedures are due are subject to procedural due process. Processes for which procedures are not yet due are subject to procedural not yet due process. Moreover, processes for which the due date is long passed are subject to procedural long overdue process.

Procedural due process often is provided by a process server. A process server must follow due procedures in serving procedural due process. If due procedures are violated, procedural process may be served, but it may not be called procedural due process unless the processes are due.

Most readers find these concepts confusing:

—302

Help

Procedural due process p. 47
pp. 51-53
p. 67
p. 123
14th amendment
pp. 44-70
pp. 120-26

File Edit Display Advance Search Audio Windows Help

Krause: Law for the idiot    p. 51

The right to procedural due process was amplified by the Supreme Court's landmark Goldberg v. Kelly decision. In Goldberg v. Kelly, Goldberg sued Kelly for infringing a right to pr dural due process. Goldberg alleged that the process relating to Kelly's procedure was not due, therefore, that Kelly could not invoke a right to procedural due process without following due procedures.

In Goldberg v. Kelly, the court held that Kelly was entitled to procedural due pr ess, because procedures were followed as a part of the process, even if not always due. This decision was very controversial, although many observers hailed it as overdue.

Since this time, legal scholars have had a difficult time explaining the concept of pr cedural due process. The process of explaining procedural due process was previously done in a procedural fashion. Changing paradigms on this topic suggest that the procedure of explaining procedural due pr c ss should only be attempted after a thorough grounding in the underlying processes. The procedures involved in this process have been declared to be unnecessarily complex. It is the author's hope that this discussion will significantly simplify the reader's understanding of pr edural due process, including each of Links Procedural due process
 *p. 47*
 pp. 51-53
 p. 67
 p. 123
14th amendment
 pp. 44-70
 pp. 120-26
Goldberg v. Kelly
 p. 32
 p. 51

Figure 5.
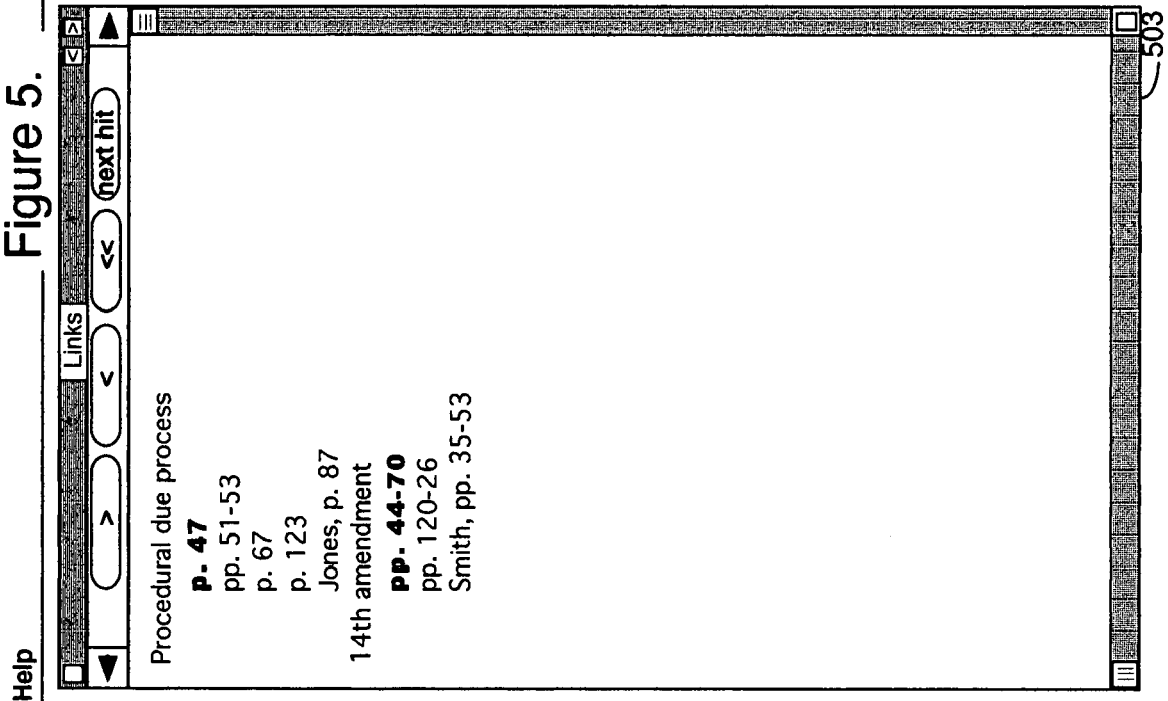
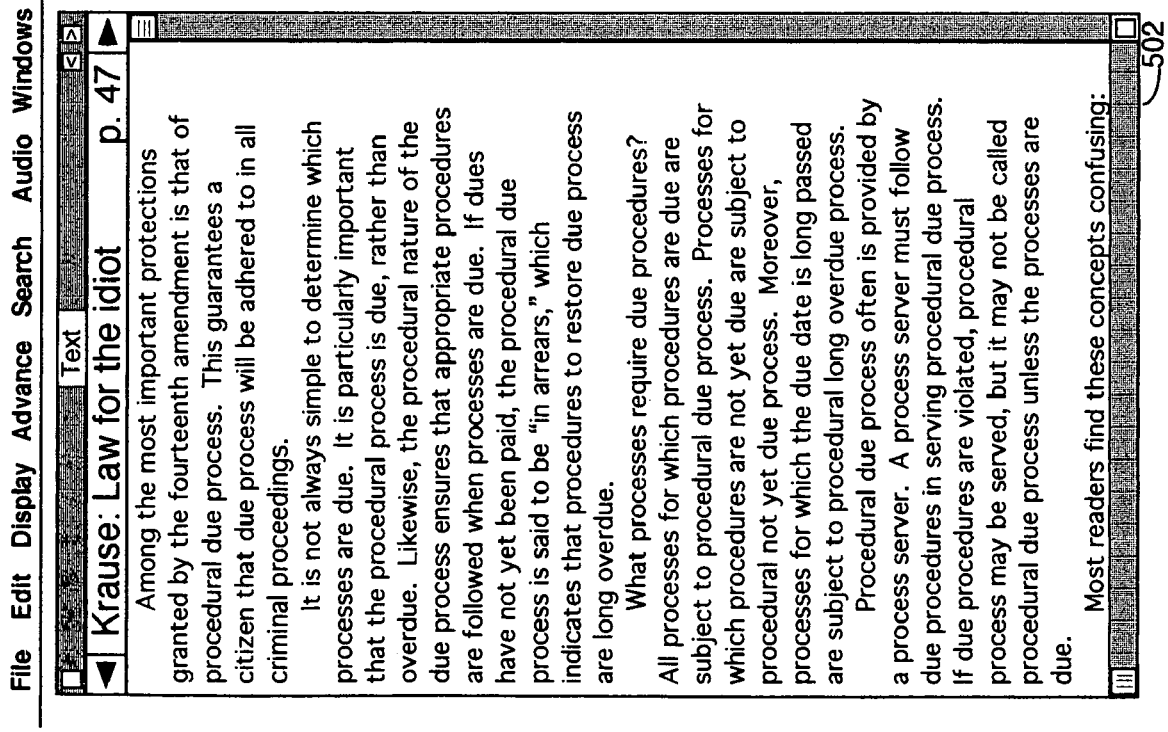

Figure 6.

File  Edit  Display  Advance  Search  Audio  Windows

Jones, Law for the fool    p. 87

Much has been written for individuals with lower intelligence on the topic of procedural du pr ss. In fact, it has been stated that an individual who represents himself has a fool for a lawyer.

In no area of the law is this more evident than in pr cedural due process. This discussion may be simplified by breaking this concept into its individual parts.

Procedures are things that are done. Due indicates a requirement. Processes also are things that are done. Thus, procedural due pr ess refers to a way of doing things to require that things are done. Procedural due pr ss needs to be carefully distinguished from processional due procedures. The major difference between these two concepts is that the former is a singular, while the latter is a plural.

In devising ways to do things to require that things are done, it is important that things not be overdone. This could have the disastrous consequence of requiring that procedural due pr ess be done over. Likewise, underdoing pr edural due process can have a major impact on a citizen's 14th amendment rights.

If a process is duly in place for a given procedure, the procedure is considered to be due. If dues are in place for a process, the dues are

602

Help    Links    ( > ) ( < ) ( << ) ( next hit )

Text

Procedural due process
p. 87
p. 134
*Krause, p. 47*
Krause, pp. 51-53
Krause, p. 67
Krause, p. 123

603

METHOD AND APPARATUS FOR ENHANCING ELECTRONIC READING BY IDENTIFYING RELATIONSHIPS BETWEEN SECTIONS OF ELECTRONIC TEXT

This application is a continuation-in-part of application Ser. No. 09/015,660, filed Jan. 29, 1998, which was based on and claimed priority to Provisional Application No. 60/036, 305 filed Jan. 29, 1997.

BACKGROUND OF THE INVENTION

This invention relates generally to the fields of information processing and display by computers, and human-machine interfaces for computers, and more particularly to a computer-implemented method for detecting relationships within one or more electronic texts and presenting those relationships to a user. The present invention further relates to providing the user with an interface which identifies relationships between texts and presents them in a manner accessible to the user on a computer display. The present invention further provides this interface in a manner which passively identifies such relationships, such that the user is not required to continuously refine search terms.

DESCRIPTION OF THE RELEVANT ART

The current art includes computer programs that allow a user reading an electronic text to perform electronic searches within the text being read or within other texts. In current art reading programs, when the reader comes across material that she wishes to study further, she must manually enter the appropriate search terms in order to attempt to identify related material in the same or other texts. Such user-initiated searches proceed from the assumption that the reader or researcher will have the presence of mind and/or patience to pursue searches within the accessible texts for all topics or subtopics that may assist her research. Further, such searches presuppose that the user has a certain amount of understanding of her topic to begin with. Examples of such search mechanisms are those employed by legal documents databases, such as Lexis and Westlaw, as well as those used by Internet search engines, such as Altavista or Yahoo.

The current art provides the reader or user with several advanced capabilities with respect to identifying concepts and search terms, including the following: 1) The current art includes internet tailoring, in which advertisements relevant to an individual's current activities might be presented. This is accomplished by performing additional searches in an index of advertisements based on a search term or a uniform resource locator selected or entered by the user. An example of this occurs when a search engine site provides direct links to other sites that are relevant to the specific search terms. 2) The current art includes methods for determining style and usage patterns, for example, as have been used in the construction of a plagiarism detector. Such a program is capable of identifying literary styles and patterns that may be specific to a single author. 3) The current art provides methods to conduct "intelligent" searches by use of dictionaries of synonyms. In such searches, a synonym of a search term may be substituted for the search term in performing the search, permitting a user to enter only one of multiple potentially related search terms to find what he is looking for. 4) The current art includes various methods for identifying concepts in documents, and of generating a list of concepts (a concept index). Identification of concepts is generally based on detection of word usages that commonly describe specific concepts. 5) The current art includes computer programs used in the analysis of large quantities of military intelligence data. Such programs attempt to identify relationships between distinct events or facts for presentation to an analyst, to aid in the analysis of intelligence data.

While such systems are generally adequate to serve a user who requires a specific answer to a specific question, they do not well serve a user—such as a reader of an electronic text—who has a broad interest in a subject. Furthermore, while a user could potentially think of useful searches while he is reading an electronic text, the disruption attendant formulating a search—and the time lost in doing so—will often result in no search being done.

Thus, the current art imposes the following disadvantages on a reader wishing to extract information from a database:

First, no method exists in the current art to automatically identify for the reader related passages in different locations of the same text or in different texts, as one text is being read.

Second, no method exists in the current art to provide for rapid access to related materials in the same or different texts.

Third, the current art requires the reader to initiate the search, thereby disrupting the reading experience, and in some cases causing the reader to become disoriented as she formulates the search, reviews search results for relevance, and then finds her way back to the text she was originally reading.

Fourth, the results of current art searches are only as good as the search query. While a reader who is an expert in a particular field may have the ability to formulate a query that will turn up just the documents she is interested in, someone lacking proficiency in the field or in the art of electronic searching may easily miss relevant documents. Moreover, even proficient searchers waste time conducting searches for information that is not in the material being searched, and inevitably fail on occasion to conduct searches that would disclose the existence of related material of interest.

What is needed is a computer program that conducts useful electronic searches without requiring continuous input from the user. The computer program of the present invention overcomes the above-described disadvantages of the current art by conducting "implied searches", in which the argument of the search is automatically extracted from a text that is of interest to the user. The present invention can conduct implied searches to detect relationships between a plurality of texts even before the reader begins to read a text, or can be used to display relationships between and among texts as a reader is reading.

The present invention facilitates a reader's frequent desire to consider additional treatment of issues under discussion. Such additional treatment may be presented elsewhere in the same text, or in a different text. However, the user has no basis for knowing which issues may be discussed elsewhere in the same or different texts. Thus, a method to identify relationships between texts, and provide the reader with direct access to related materials, would substantially enhance the enjoyment and comprehension of the texts.

In an exemplary embodiment of the method, material being displayed on the screen constitutes an argument for a search within the same or a different text. Depending on the user's preference, various features of this argument will trigger the display of results of searches elsewhere within the same document or within other documents. The user is then provided with 1) information that related material exists elsewhere within the same text or within a different text, and 2) access to the related materials, via the computer system, in a fashion that does not lose the user's place in the text originally being read. In this exemplary embodiment, the related material may also be accessed over a network, including the internet.

In a preferred embodiment, the specific features of the text being displayed that may trigger such searches can include: 1) the presence of rare words or their synonyms within the text, such that when words that occur a limited number of times within the text are encountered, a search is triggered, 2) the presence of a multiplicity of rare words or their synonyms in specified close proximity to one another, such that when these words are encountered together, a search is triggered, 3) the presence of words in a predefined list, such as an author-defined index to a text, its table of contents, or footnotes to the text, and 4) the presence of related concepts, as defined by other methods for identifying concepts in text. In a preferred embodiment, the specified searches take place as or before the text is being read, and the existence of related material is reported such that the reader becomes aware of its existence as she reads material from the original text.

This invention is enabled by the current art of computer programming, which permits a computer programmer of ordinary skill to perform the programming steps necessary to implement this invention with reference to this description and the accompanying drawings.

Definition of terms

A text is a compendium of words, which may take many forms, including those of internet pages, books, articles, e-mails, etc. A text may also include figures or tables that are related to the written material in the text. A text may be presented by many different types of computer systems, including (but not limited to) browsers, word processors, e-books, computer controlled televisions, and readers. Thus, a text may be in many different formats, including (but not limited to) ASCII, XML, HTML, proprietary word processor formats, open e-book format, pdf format, and graphics display formats.

A section of text is any subset of a text (including the whole text).

An implied search is a search for which the argument of the search is material related in a defined way to that presented on a computer display. Although the user did not specifically request a search on any of this material, the fact that it is displayed causes a computer to provide information on the results of this search to the user of the computer system.

An index is a data structure containing terms and pointers. For each term, pointers define zero or more locations in a text at which the term is used or a concept related to the term is discussed. Indexes include author's indexes, tables of contents, concept indexes, etc.

A concordance is an index for which the terms are words derived from at least one text.

An outline of a text includes some subset of the text, preferably related to the organizational structure of the text. For example, an outline may contain only headings from the text, and could be displayed in a way that makes the relationships between different headings clear. An outline may also contain additional information related to the text.

OBJECTS AND SUMMARY OF THE INVENTION

The present invention provides an implied electronic searching mechanism that provides enhanced functionality and flexibility over conventional methods of electronic searching.

One object of the present invention is to alert a reader to the existence of related concepts elsewhere in the same or a different text without interfering with her reading of the original text.

Another object of the present invention is to improve a reader's comprehension of a text, by minimizing external distractions as the text is being read, and simultaneously providing access to information likely to be related to material being read at any given time.

Another object of the present invention is to detect relationships between and among a plurality of texts that would not otherwise be apparent, or which could only be detected by reading each book, or by fortuitously conducting a user-defined search that happened to detect the relationship.

Another object of the present invention is to supplement textual information being read with related information from computer-accessible texts.

Another object of the present invention is to provide a searching mechanism that has utility for the user but which requires no real-time user input to initiate.

Another object of the present invention is to provide a user with a way of determining whether two or more concepts are truly related.

Another object of the present invention is to provide a user with a way of accessing related information in a text from an outline of the same or a different text.

Another object of the present invention is to take advantage of specific information regarding concepts displayed in a text in order to identify other related concepts in the same or a different text.

Another object of the present invention is to permit a reader to designate specific types of concepts about which she desires to receive additional information. These concepts may be based on locations within the text or on the proximity of rare words or their synonyms within the text either to each other or to words on a predefined list of concepts, or based on other concept finding methods in the current or future art.

Another object of the present invention is to permit a reader to signal the computer to provide more information on identified related concepts elsewhere in the same or in a different text.

The present invention, as broadly described herein, provides a user interface and method for using a computer system to identify and present related concepts in at least one text presented on a computer display controlled by the computer, comprising the steps of 1) accessing, using the computer system, at least one text, each text comprising at least one section of text, 2) identifying at least one reference to at least one concept contained in a section of text, 3) identifying at least one additional reference to a concept related to the concept identified in step 2 in at least one additional section of text, and 4) providing information about a reference identified in step 3. Some of these steps may occur concurrently or in a different order.

Also, according to the present invention, a computer system comprising means for effectuating the method of the present invention is provided. Further according to the present invention, computer-readable memory encoded with a program directing the computer system to effectuate the method of the present invention is also provided.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

FIG. 3 presents a sample text display block, such as that which could be presented by text presentation or word processing programs. A link display box that provides the results of an implied search is also presented. This figure relates to identifying relationships within a single text.

FIG. 4 presents a sample text display block, such as that which could be presented by text presentation or word processing programs. A link display box that provides the results of an implied search is also presented. The presented material is based on specific user input on the link display box presented in FIG. 3.

FIG. 5 presents a sample text display block, such as that which could be presented by text presentation or word processing programs. A link display box that provides the results of an implied search is also presented. This figure relates to identifying relationships within a plurality of texts.

FIG. 6 presents a sample text display block, such as that which could be presented by text presentation or word processing programs. A link display box that provides the results of an implied search is also presented. The presented material is based on specific user input on the link display box presented in FIG. 5.

DETAILED DESCRIPTION OF THE PREFERRED EMBODIMENTS

Reference will now be made in detail to the present preferred embodiments of the invention, examples of which are illustrated in the accompanying drawings. The steps required to practice this invention are readily accomplished by a person of ordinary skill in the art of computer programming, with reference to this description and the accompanying drawings.

Figure 1:
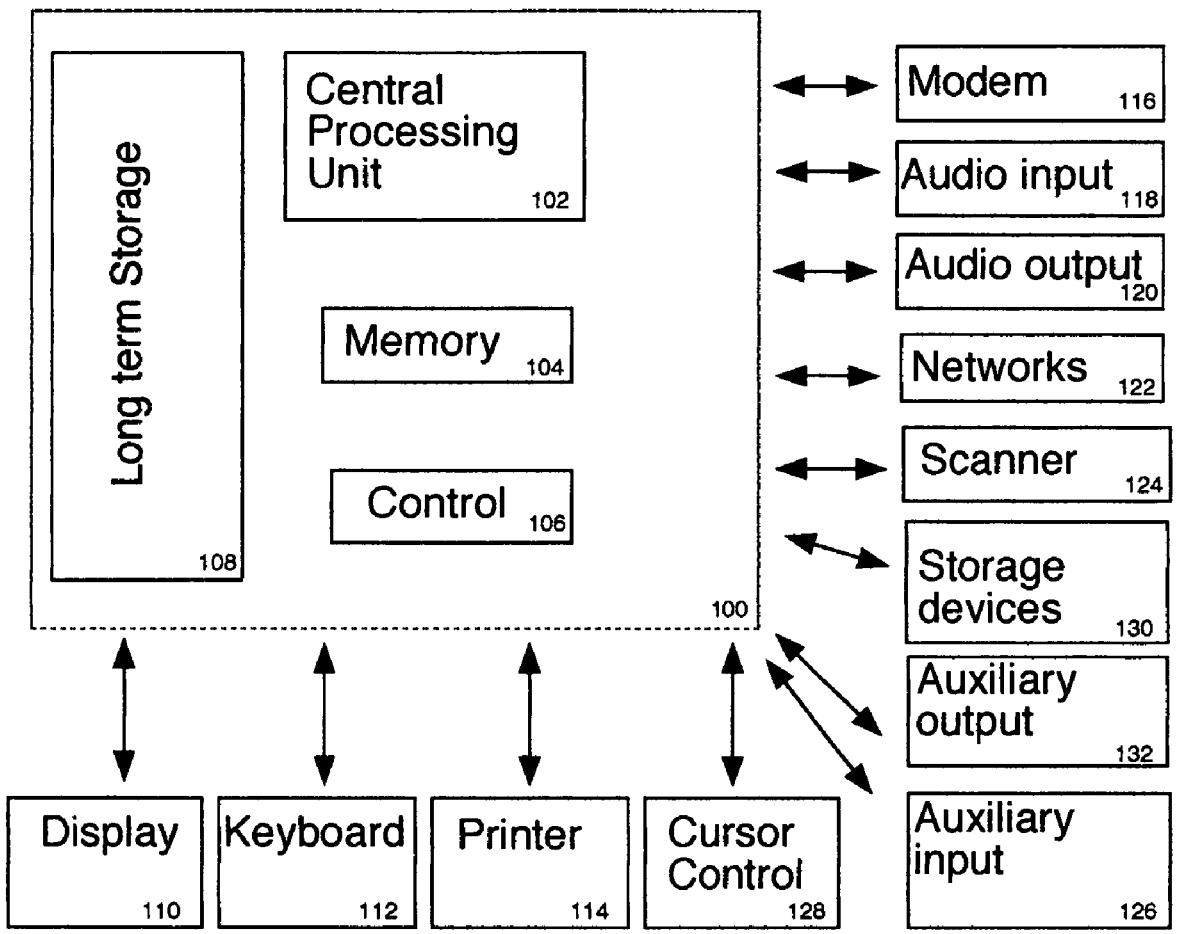
FIG. 1 presents a block diagram of a computer system as may be utilized by the present invention.

The invention is described in the context of a computer system (100), as pictured in FIG. 1, which consists of at least one Central Processing Unit (102), memory (104, which may be random-access or read only memory), a Control function (106), and optionally random access long-term storage such as a hard disk or other disk drives (108). In addition, such systems may contain additional means for input such as storage devices (130), a keyboard (112), one or more cursor control devices (128), auxiliary input (126), scanners (124), audio input such as a microphone (118), for output such as storage devices (130), amplified loudspeakers for audio output (120), one or more display devices such as a monitors (110), one or more printers (114), auxiliary output (132), and access to other computer systems via modem (116) or networks (122). Thus, a computer system includes devices currently known as personal computers, mainframe computers, supercomputers, laptop computers, personal digital assistants, network computers, servers, routers, hubs, control boxes, etc. A computer system is also defined as a network of computer systems, including local area networks, dial-up networks, wide area networks, and the internet. The preferred embodiment is described in the context of a computer system which is capable of running programs in a Windows™ environment.

Figure 2:
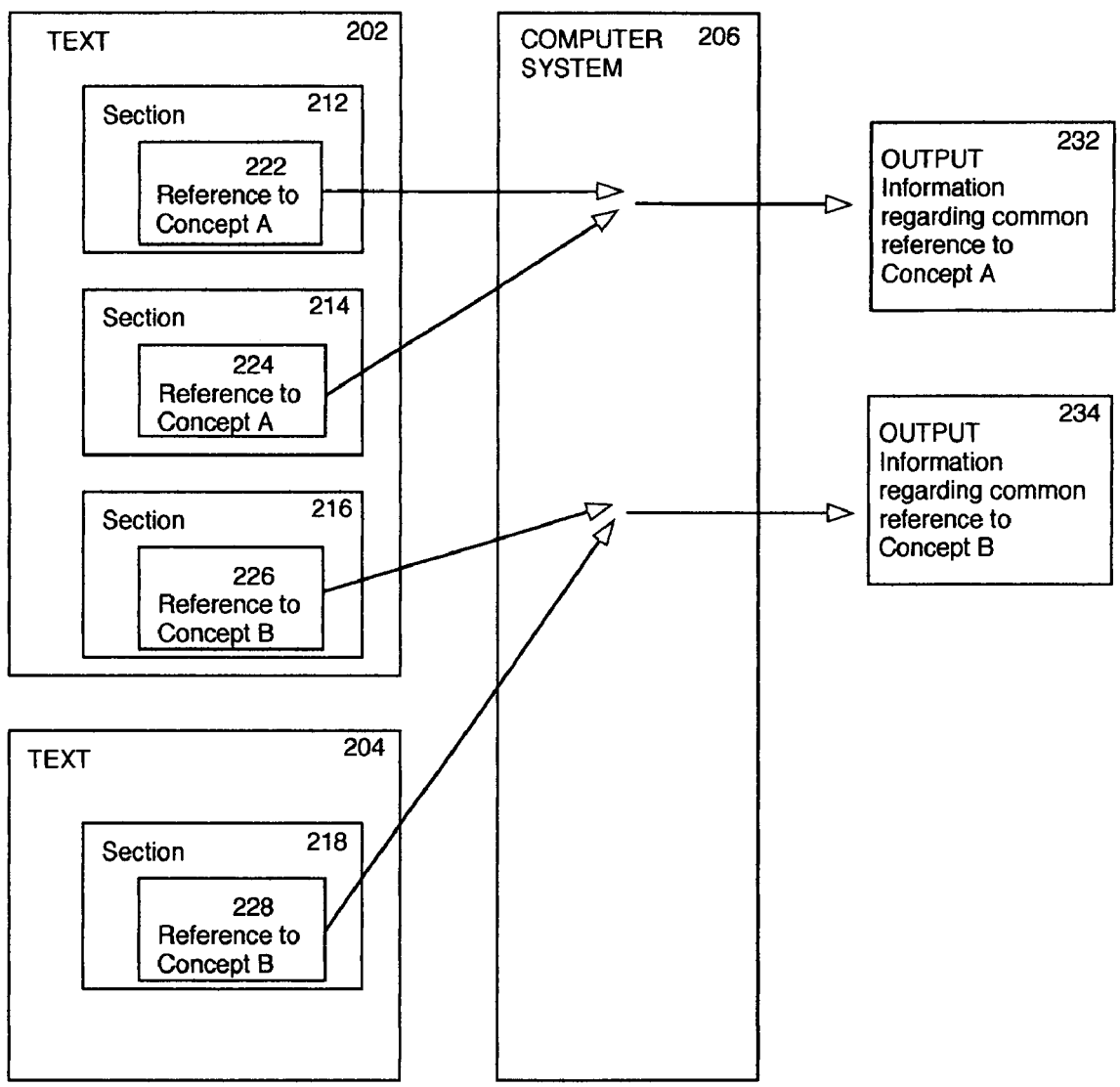
FIG. 2 is a schematic diagram to aid in understanding the four major steps of the invention. While the invention can be practiced in a manner different from that depicted in the schematic diagram, the schematic diagram provides a useful overview for understanding the invention.

A simplified preferred embodiment of the invention is presented schematically in FIG. 2. According to the method, a computer system (206) is used to enhance a reader's reading of an electronic text by 1) accessing, using the computer system (206), at least one text (e.g., 202, 204), each text comprising at least one section of text (e.g., 212, 214, 216, 218); 2) identifying at least one reference to a concept (e.g., 222, 226) contained in a section of text (e.g., 212, 216); 3) identifying at least one additional reference to a concept related to the concept identified in step 2 in at least one additional section of text (e.g., for 212/222 this could be 214/224, and for 216/226 this could be 218/228); and 4) providing information about (which may include access to) a reference identified in step 3 (e.g., 232, 234).

Initially, for simplicity of description, a simple embodiment of this invention will be described in detail. Thereafter, enhancements that increase the utility of the invention will also be discussed.

In a preferred embodiment, the invention enhances the reader's enjoyment and understanding of a text by presenting information regarding related material that appears elsewhere in the text. There are many possible ways of presenting this information to the reader; among the simplest is to provide a link (that may be clicked on with a mouse) to the related material. In this embodiment, the existence of the link indicates that related material exists elsewhere. If the reader clicks on the link, a new window containing the related material appears. A simple method for finding related material is based on the author's index of the book being read. In this simple preferred embodiment, when a page that is referred to in the author's index is being viewed, the screen also displays a representation of all index entries referring to that page. As depicted in FIG. 3, the reader is reading page 47 of a text, viewed in a text display box 302, and link display box 303, which is displayed in a separate window, displays all index entries that include page 47. The reader sees that the author has cited page 47 as containing information on the subject of procedural due process, and also sees that pages 51–53, 67, and 123 also contain such information. Moreover, page 47 is part of a broader discussion of the fourteenth amendment, which is treated at pp. 44–70, and 120–26. In this embodiment, the reader is thus made aware of the existence and location of related material which can be accessed by clicking on the page number.

FIG. 4 demonstrates the view that the reader would obtain by clicking on "51–53" on FIG. 3 in a preferred embodiment. As depicted in FIG. 4, the reader is now viewing a new window 402 that starts on page 51, and all references to "procedural due process" are highlighted (in this example, by bolding) or underlined or otherwise made to stand out from surrounding text. In addition to the standard features depicted for the screen in FIG. 3, the reader on FIG. 4 has the option of pressing "next hit" 405 which will bring the reader to the next point in pages 51–53 that the words "procedural due process" are used. The reader also may select an additional reference to "procedural due process" from the link display box 403 (for example, the discussion on p. 67), or references to other material, e.g., Goldberg v. Kelly which are referred to on the current page (p. 51). In the link display box, the current reference (pp. 51–53) is in bold.

Areas that have already been examined are displayed in italics (in this example, p. 47). Clicking the arrows ">" 407 or "<" 409 permits the user to traverse one selection forward and backward among the selected references (with concomitant changes in the viewed text display box and link display boxes to correspond to the selected reference), and selecting "<<" 411 returns the user to her original place on the base page, in this example, page 47. Thus, in this example, clicking "<" or "<<" would return the reader to page 47. At that time, clicking on ">" would return the user to page 51.

It may be noted that the initial display of information regarding related material occurs independently as the reader reads the text, without further direct input from the reader. This represents a type of "implied search," a term that describes a search that is based on the material being displayed, with no real-time input from the reader.

In an alternate preferred embodiment, links to related material are displayed in the same window as the text being read.

The example discussed above and depicted in FIGS. 3–4 concerns a fairly simple type of relationship that may exist between different portions of a single text, that of shared references within the author's index. The same principle can equally be applied to shared references within authors' indexes for a plurality of texts. Thus, a computer program of this invention with access to a plurality of indexed texts presents not merely the index entry for the author's index for the text being read, but also presents representations of index entries from other texts that relate to the indexed subjects on the page being read. Terms in such indexes may be related by 1) being identical, 2) being synonyms of one another, or 3) referring to related concepts. This more complex embodiment is depicted in FIGS. 5–6.

In FIG. 5, the reader of page 47 sees not only the index entry for the text being read, but also sees representations of index entries of the other texts to which the computer has access. In this case, clicking the "Jones, p. 87" under "procedural due process" brings the reader to page 87 of the text authored by Jones, as depicted in FIG. 6, which in many ways resembles FIG. 5. In the preferred embodiment depicted in FIG. 6, the link display box 603 is that applicable to base page 87 the Jones text. Options for further research (including the use of "next hit", ">", "<", and "<<") are analogous to those displayed in FIG. 4 for a single text, but also now apply to a plurality of texts. In other preferred embodiments, the reader has the ability to view the link display box that is applicable to page 47 of the original reference.

In implementing this preferred embodiment, the invention may (without real-time user input) generate a table from the indexes of a plurality of texts. The table may be sorted or organized in any number of ways, e.g., alphabetically by subject (so it appears as a traditional author's index, except with more entries and entries refer to one or more books), or by number of hits (e.g., topics which seem to be discussed the most in one or more texts). In a preferred embodiment, the reader has the ability to sort and view this table according to his preferences.

In an alternative preferred embodiment, a library of texts for the use of this invention is supplied. This library may exist on a single computer system, on a single network, or on networks of networks such as the internet.

The embodiments described in FIGS. 3–6 address the relatively simple case where the text or texts being read has been indexed, and provide a novel user interface to present the indexing information to the reader in a manner in which its utility is optimized.

Alternative preferred embodiments of this invention are not dependent on the presence of author's indexes to detect relationships that may exist between portions of texts. In a preferred embodiment, the invention has the capability of generating its own indexes based on prespecified criteria well known in the current art. These criteria can be used to generate indexes of names, concepts, rarely used words, synonyms, etc. In a preferred embodiment, the invention is also capable of using other types of indexes, such as concordances, and those utilized by internet search engines to represent the information found at various internet web sites. In another preferred embodiment, the invention simultaneously uses several different indexing methods to identify relevant material. The generation of these indexes may be performed by the invention, or may be implicit in cases where the index is already supplied with the text.

In an alternative preferred embodiment, relationships between references to concepts in sections of text may be detected by methods including: 1) the shared presence of certain words, that may be prespecified by the user (for example, the presence in two different sections of text of words present on a word list provided by the user), 2) the shared presence of combinations of words in an order and within a proximity that may be prespecified by the user (for example, the use of "house" and "representative" within two words of one another could define a related concept ("House of Representatives"), while either of these words individually might not), 3) the shared presence of words or combinations of words that are recognized by the invention to relate to a concept (for example, "House of Representatives" and "Senate" could both be recognized to relate to "Congress"), 4) the shared presence of words that appear in the texts with some specified frequency relative to other words, either singly or in combination with other words (for example, two different sections of text that use the term "lawyer" at least 4 times could be considered to relate to similar concepts; this method also can be used to identify similar patterns of specified or rare grammatical usage, which might aid in detecting common authorship of different texts and making the reader aware of this relationship), 5) the shared presence of synonyms of words in any of the foregoing circumstances (for example, "barrister" and "attorney" could also be considered equivalents of "lawyer"), 6) the shared citation of related sources (for example, two sections of text that cite the same source—or different sources that are related based on title, topic, or author—could be considered to be related), 7) analysis of concordances of one or more sections of text (for example, repeating patterns of word usage might become more readily apparent through analysis of concordances), 8) statistical analysis of word usage in any of the foregoing circumstances (for example, unusual patterns of word usage might be identified in part by statistical analysis of the likelihood of the juxtaposition of the words by chance), 9) analysis of commands (for example, in HTML or XML) that are embedded in one or more sections of text, and 10) other means of identifying concepts, many of which are in the current art. In this sense, the term "words" may include related words of different parts of speech, for example, "analytical" might be deemed sufficiently similar to "analyze," or indeed to "investigation" (which is a synonym for "analysis"). It is known in the current art that there are methods of quantifying the strength of relationships between two or more references to concepts. Some of these techniques are currently used to rate outcomes of searches by internet search engines. In an alternative preferred embodiment, previously-generated indexes are not necessarily required to identify relationships within one or more texts. Although it is convenient for the computer system to store information related to the discussion of concepts in an index (whether it is generated prior to use of the invention or in real-time), it is also possible to practice this invention without an index.

In a preferred embodiment, concepts are considered to be related to each other if they are identical, one is included within the other (for example, "lawyers", "judges", and "courts" are also included in the general concept of "the legal system"), or share a relationship to another concept (in this example, "lawyers" and "judges" are related to one another because of their common relationship to "the legal system").

In a preferred embodiment, methods to determine the types of relationships to be detected in one or more texts include 1) use of dialog boxes, 2) selection from lists of types of relationships to be identified, and/or 3) default settings based on the invention's analysis of the text to be read or settings preset by a practitioner of this invention. In a preferred embodiment, these methods are used to collect information regarding which of the previously-described methods of detecting relationshipos between sections of text the user desires the invention to use. The user may also provide input regarding which text or texts to analyze, either by default (as might occur when the invention is packaged with a specific text or texts), or directly.

In the preferred embodiment initially described above, relationships were presented by the display of index entries and accessed by use of mouse-clicks to define the user's desire regarding how much information to present about a given relationship. In an alternative preferred embodiment, methods to present the relationships identified above include: 1) presentation of a list of relationships identified between portions or all of one or more text, 2) presentation of information related to the relationship, 3) presentation of a link to the related section of text, 4) presentation of the related section of text, 5) presentation of information related to one or more identified relationships in the context of the organizational structure of one or more texts (for example, on an outline of a text), or 6) some combination of the foregoing. For example, a sortable index that provides information regarding the frequency and location of discussions of the concepts may be provided.

In a preferred embodiment, an outline of a text can be used to provide information about the text in the context of the text's organizational structure. While reading a text, a reader can view an outline that describes all the chapter titles, headings, and subheadings of the same or a different text in a separate window. As the reader reads the text, information about related concepts is displayed on this outline, in positions relative to these titles and headings that match the original positions in the text. In another preferred embodiment, all references to concepts shared by one or more texts are displayed on outlines of those texts, independently of the specific section of text being read by the reader. In some cases, it is not necessary for a specific section of text to be displayed, permitting comparison of relationships between one or more texts to proceed only through use of corresponding outlines.

Because there are multiple potential ways of describing the organization of a text in outline format, the reader has the option of simultaneously viewing more than one outline for a specific section of text. In addition to information about relationships between sections of text and the organizational structure of a text, outlines may also contain other information. This includes results of operations on the text, such as searches for specific words, information about (or access to) figures, tables, footnotes, annotations, and the like. The reader has the option of determining which outlines will be used to provide information about relationships identified by this invention.

It may be desirable for more than one outline related to a specific text to be displayed. This may occur when additional information is displayed on one or more of the outlines (for example, the results of other searches), when different outlines correspond to different sections of text, or when different outlines correspond to different ways of describing the organization of the text. In one embodiment of this feature, a reader simultaneously views a text window and two outline windows. The first outline window provides results of implied searches on the text being read relative to the table of contents of the text (including subheadings), and the second outline window provides results of these implied searches on a computer-generated outline of the text.

In a more complex embodiment, this invention is used to conduct implied searches over the internet, using as input the material displayed in a given text. Links to relevant texts, which may include web sites, are presented in the link display box.

In an even more complex embodiment, the relevance of specific links is determined by the number of searching or indexing methods that yield a specific result, thus permitting the relative ranking of results in a link display box similar to 303 or 403 in FIGS. 3 and 4, respectively, based on the number and types of methods that yield each specific result.

It will be apparent to those skilled in the art that the invention described herein is not limited to the specific preferred embodiments discussed above. For example, although the above discussion describes a program that uses a mouse and runs on a Windows™ platform, those skilled in the art will recognize that the invention could also be practiced with input devices such as trackballs, joysticks, light pens, and the like, and could also be usefully implemented on platforms such as Macintosh, X-Windows, Windows CE, NextStep, OS/2, Motif, Unix, Linux, Java, Palm OS, various internet browsers, and the like. In addition, it will also be apparent to those skilled in the art that embodiments of this user interface which provide results equivalent to those obtained regardless of whether an index is provided or generated also fall within the scope of this invention and claims. This invention also may be practiced on stand-alone machines constructed for this purpose, or on variants of computer systems, such as personal digital assistants, electronic books, palmtop PCs, computer-controlled televisions (including Web-TV) and the like. Moreover, those skilled in the art will recognize that this invention or parts of this invention could be practiced using computer hardware, bypassing the use of software for the purpose of providing the functionality of this invention. Furthermore, those skilled in the art will recognize that this invention may be practiced as a part of any computer program which displays text, as defined broadly herein, including but not limited to word processors, text readers (including those which audibly read text) and other text display programs. It will also be apparent to those skilled in the art that various modifications can be made to this invention of a computer-implemented method and a computer system that provide a user interface that provides an implied search for related materials, without departing from the scope or spirit of the invention and claims. It is also intended that the present invention cover modifications and variations of the described user interface within the scope of the appended claims and their equivalents.

I claim:

1. A method for using a computer system, in response to a reader's request for display of electronic text, to automatically identify and provide additional reading material related to concepts referred to within said electronic text comprising, in sequence, the steps of:
   a) accessing, using the reader's computer, electronic text requested for display by the reader, said electronic text containing at least one text section;
   b) using said at least one text section to automatically formulate, on the reader's computer, a search request related to a concept referred to in said at least one text section;
   c) responsive to said search request, automatically searching an index, wherein
      i) said index contains a plurality of terms by which it may be searched;
      ii) substantially all terms in said index are associated with at least one pointer to a text section; and
      iii) at least one term in said index is associated with a plurality of pointers, at least two of said plurality of pointers pointing to different text sections;
   d) responsive to step (c), automatically identifying additional reading material related to said concept; and
   e) automatically displaying on said reader's computer display, an indicator of said additional reading material together with at least one link to a source of said additional reading material, side-by-side with a portion of the electronic text referred to in step (a).

2. The method of claim 1, wherein said additional reading material of step d is accessible over a network.

3. The method of claim 2, wherein said network is the internet.

4. The method of claim 1, wherein the method of formulating said search request comprises selecting certain words from said text section, wherein said index includes words present in other text sections, and wherein said additional reading material contains all words in said search request.

5. The method of claim 1, wherein the method of formulating said search request comprises analyzing said text section for the presence of combinations of certain words in a specific order and within a specified proximity of one another, wherein said index includes words from other text sections, and wherein said additional reading material contains the same combinations of certain words in said specific order and within said specified proximity of one another.

6. The method of claim 1, wherein the method of formulating said search request comprises analyzing said text section for patterns of word usage that are recognized by the computer system to relate to a concept.

7. The method of claim 1, wherein the method of formulating said search request comprises analyzing the frequency with which at least one word appears in said text section relative to other words.

8. The method of claim 1, wherein the method of formulating said search request comprises analyzing said text section for citation of references, and wherein said additional reading material cites at least one source cited by said text section.

9. The method of claim 1, wherein the method of formulating said search request comprises analyzing said text section for embedded commands.

10. The method of claim 1, wherein the method of formulating said search request comprises statistical analysis of word usage within said text section.

11. The method of claim 1, wherein the method of formulating said search request comprises identifying an index entry referring to said text section.

12. The method of claim 1, wherein said search request is contained in a list of potential search terms.

13. The method of claim 1, wherein said search request comprises words within said text section of step (a).

14. The method of claim 1, wherein said search request comprises a plurality of words.

15. The method of claim 1, wherein said search request comprises a synonym of at least one word in said text section.

16. The method of claim 1, wherein said additional reading material is related to said section of text by discussion of identical concepts.

17. The method of claim 1, wherein said additional reading material is related to said section of text by discussion of concepts that are related to one another.

18. The method of claim 17, wherein said concepts are considered related to one another when both are related to a third concept.

19. The method of claim 17, wherein said concepts are considered related to one another when one is included within the other.

20. The method of claim 1, wherein said index is an author's index to said requested text.

21. The method of claim 1, wherein said index is generated automatically by a computer system.

22. The method of claim 1, wherein said index is a search engine.

23. The method of claim 1, wherein said index is accessed via a computer network.

24. The method of claim 1, wherein said display occurs In a browser window.

25. The method of claim 1, wherein said indicator of additional reading material is an excerpt of said additional reading material.

26. The method of claim 1, wherein the indicator of additional reading material is an index term.

27. The method of claim 17, wherein the computer system obtains input from the reader regarding the types of relationships between references to concepts to provide information about in step (d).

28. The method of claim 27, wherein the computer system obtains input from the reader regarding the strength of relationships between related concepts to provide information about.

29. The method of claim 1, wherein said indicator of additional reading material is displayed on an outline of at least one text.

30. The method of claim 1, wherein said index to be searched may be selected by the reader.

31. The method of claim 1, wherein additional information resident on the reader's computer influences said search request.

32. The method of claim 1, wherein said text requested by the reader is obtained via a computer network.

33. A computer system that, in response to a reader's request for display of electronic text, automatically identifies and provides additional reading material related to concepts referred to within said electronic text comprising:
   a) means for accessing electronic text requested for display by the reader, said electronic text containing at least one text section;

b) means for using said at least one text section to automatically formulate a search request related to a concept referred to in said at least one text section;
c) means for, responsive to said search request, automatically searching an index, wherein
   i) said index contains a plurality of terms by which it may be searched;
   ii) substantially all terms in said index are associated with at least one pointer to a text section; and
   iii) at least one term in said index is associated with a plurality of pointers, at least two of said plurality of pointers pointing to different text sections;
d) means for, responsive to step (c), automatically identifying additional reading material related to said concept;
e) means for automatically displaying on said reader's computer display, an indicator of said additional reading material together with at least one link to a source of said additional reading material, side-by-side with a portion of the electronic text referred to in step (a); and
f) a display device controlled by a computer.

34. A computer memory storage device encoded with a computer program that, in response to a reader's request for display of electronic text, automatically identifies and provides additional reading material related to concepts referred to within said electronic text comprising:

a) means for accessing electronic text requested for display by the reader, said electronic text containing at least one text section;
b) means for using said at least one text section to automatically formulate a search request related to a concept referred to in said at least one text section;
c) means for, responsive to said search request, automatically searching an index, wherein
   i) said index contains a plurality of terms by which it may be searched;
   ii) substantially all terms in said index are associated with at least one pointer to a text section; and
   iii) at least one term in said index is associated with a plurality of pointers, at least two of said plurality of pointers pointing to different text sections;
d) means for, responsive to step (c), automatically identifying additional reading material related to said concept; and
e) means for automatically displaying on said reader's computer display, an indicator of said additional reading material together with at least one link to a source of said additional reading material, side-by-side with a portion of the electronic text referred to in step (a).

* * * * *